United States Patent Office 3,606,538
Patented Sept. 20, 1971

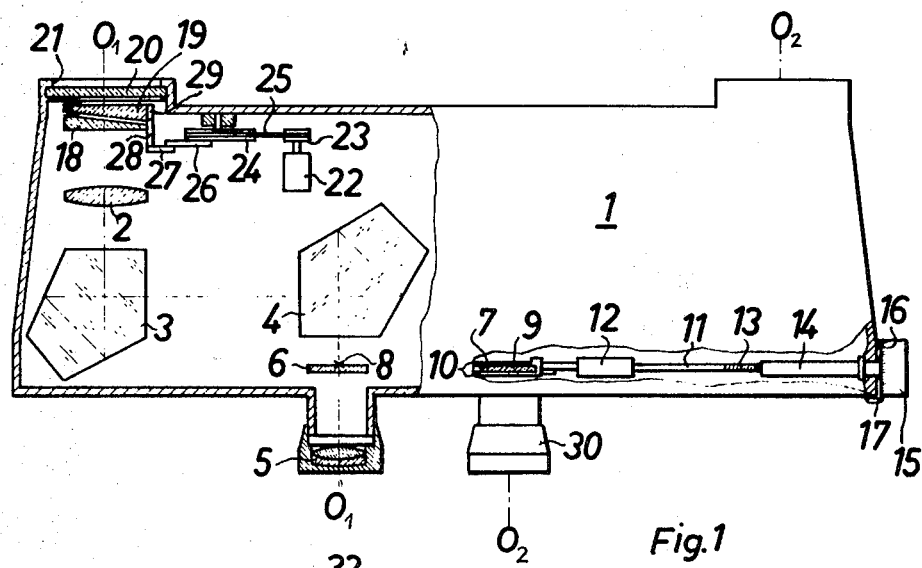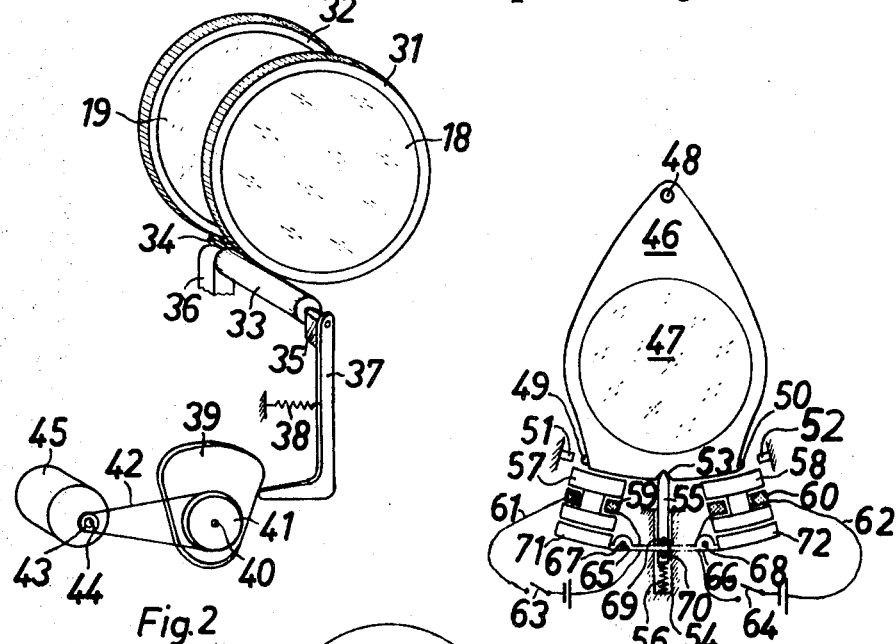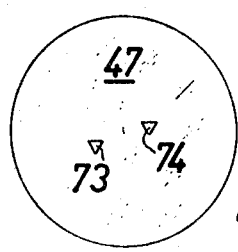

3,606,538
STEREOSCOPIC VIEWING SYSTEM
Siegfried Hesse, Jena, Germany, assignor to
VEB Carl Zeiss, Jena, Germany
Filed Apr. 25, 1969, Ser. No. 819,498
Int. Cl. G01c 3/14
U.S. Cl. 356—12                                   3 Claims

ABSTRACT OF THE DISCLOSURE

A system for stereoscopic observation of a pair of images of an object includes at least one stereoscopic mark. Accuracy of stereoscopic measurement is increased by periodical relative motion of the object or the pair of images on the one hand and the stereoscopic mark on the other. The frequency $f$ and the amplitude A of the relative motion are respectively 10 min.$^{-1} \leq f \leq 50$ min.$^{-1}$ and $$1\frac{\Delta w}{\Gamma} \leq A \leq \frac{\Delta w}{\Gamma}$$

$\Delta w$ being the mean width revolving power of the human eye; and $\Gamma$, the angular manification of the observation system.

---

This invention relates to a stereoscopic viewing system which includes at least one stereoscopic mark and in which a defined periodic relative motion between the stereoscopic mark and the object takes the form of a pendulum oscillation into balance position.

Distances of points in nature or in a pair of images are measured stereoscopically by means of viewing systems made up of two telescopes or microscopes. The image plane of each telescope or microscope contains a mark or an image of this mark, binocular observation fusing the two marks to one displaceable stereoscopic mark. For moving this stereoscopic mark in depth, one of the marks, or both, are shifted at right angles to the optical axis of the respective telescope or microscope, so that the parallactic angle formed by the collimating rays is varied. The depth movement of the stereoscopic mark can be measured and read for example on a scale calibrated to represent units of length. In the process of measurement, the stereoscopic mark is brought to coincidence with the stereoscopic image of the object. As is well known, accuracy of coincidence in stereoscopic measurement depends on the power of the human eye to resolve width. This power, designated $\Delta w$, is in the mean 10″ (seconds of arc), and a viewing system of an angular magnification $\Gamma$ increases it to $\Delta w/\Gamma$.

The present invention aims at further reducing the unavoidable errors in stereoscopic measurement that are inherent in the shortcomings of the human eye with respect to resolution of width.

To this end the present invention provides that the frequency $f$ of the periodic relative motion is $$10 \text{ min.}^{-1} \leq f \leq 50 \text{ min.}^{-1}$$

and that the amplitude A of the relative motion is $$1\frac{\Delta w}{\Gamma} \leq A \leq \frac{\Delta w}{\Gamma}$$

wherein $\Delta w$ is the mean width-resolving power of the eye and $\Gamma$ the angular magnification of the viewing system. Contrary to the common conception that periodic depth oscillations of an object about a medial position corresponding to the depth to be measured, generally reduce the accuracy of measurement, the present invention teaches that there are definite conditions of oscillation which improve this accuracy. Either the stereoscopic mark oscillates relatively to the object, or the object (or the image thereof) oscillates relatively to the stereoscopic mark (or the image thereof). A frequency $f=30$ min.$^{-1}$ and an amplitude $$A = 2\frac{\Delta w}{\Gamma}$$

are considered as particularly favorable for the method, these parameters realizing measuring accuracies which are about twice the accuracy obtained by the known coincidence method.

The method of the invention is favored by the phenomenon that the inertia of the stereoscopic mark or the object, or both, at each of the reversal points of the relative motion has a definite time relationship to the entire period of motion. The duration of this inertia is preferably one-quarter of a period.

For carrying the method of the invention into practical effect, it is expedient to employ a stereoscopic viewing system which comprises a pair of eyepieces, each eyepiece being conjugate to one objective, and in which at least one mark appears in the image plane of each objective. This viewing system also comprises optical-mechanical means which are located in one of the two observation ray paths and produce the defined periodic relative motion. The measuring accuracy can be increased by so mounting the stereoscopic mark that it can oscillate. For the relative motion, an optical element of defined refraction is inserted in the observation ray path between one of the marks and the distant object. When the mark is being reflected into the ray path, the optical element lies on the object side of the mark image. Instead of one mark in the image plane of the objectives of the viewing system, two marks can be used which, when viewed stereoscopically, appear as two stereoscopic marks separated from one another in depth by a distance equal to twice the amplitude of the relative motion.

The method of the invention considerably improves the stereoscopic measuring accuracy or, if so such improvement is required, provides a substantial reduction of the cost inherent in optical and/or mechanical parameters of the viewing instrument.

In order that the invention may be more readily understood, reference is made to the accompanying drawing which illustrates diagrammatically and by way of example one embodiment thereof, and in which FIG. 1 is a part-sectional view from above of a stereoscopic observation system, FIG. 2 is a device for producing relative motion of stereoscopic mark and object, FIG. 3 is an alernative to FIG. 2, and FIG. 4 is a mark carrier.

In FIG. 1, a housing 1 includes a stereoscopic viewing system made up of two identical component systems having, respectively, optical axes $O_1$—$O_1$ and $O_2$—$O_2$ (the system with the axis $O_2$—$O_2$ not shown in the drawing). Each component system comprises an objective 2, two ray-deviating pentaprisms 3 and 4, and an eyepiece 5. A transparent carrier 6 has a mark 8 which is located in the eyepiece image plane of the system of the axis $O_1$—$O_1$, and a transperent carrier 7 has a mark 9 which is located in the eyepiece image plane of the system of the axis $O_2$—$O_2$. Stereoscopic viewing fuses the marks 8 and 9 into a stereoscopic mark image or floating mark. The carrier 7 is displaceable in guides 10 and secured to the one end of a shaft 11 which rotates in a bearing 12 fast with the housing 1. The other end of the shaft 11 is provided with a thread 13. The thread 13 engages a nut 14 which is locked against axial displacement and passes outward through the housing 1, where it is fast with a knob 15 having a peripheral scale 16 working against an index 17.

A pair of glass wedges 18, 19 on the object side of the objective 2 are rotatable relatively to each other about the axis $O_1$—$O_1$. A plane-parallel plate 20 closes an aperture 21 in the housing 1. The glass wedges 18 and 19 are operated by a motor 22, two pulleys 23 and 24, a band 25, a push rod 26, a lever 27 and two contrarotating shafts 28 and 29. The pulley 24 and the shafts 28 and 29 are mounted on the interior wall of the housing 1.

The rays of a light beam entering through the aperture 21 are focused in the plane of the mark 8 by the objective 2 of the left component of the stereoscopic system. The rays of the light beam in the right component of the stereoscopic system are focused in the same manner in the plane of the mark 9. Observation through the eyepieces 5 and 30 fuses the marks 8 and 9 into a stereoscopic mark, which occupies a definite place in space. The position of the stereoscopic mark can be varied in depth by rotation of the knob 15 and consequent displacement of the carrier 7 and the mark 9 in the guides 10, this displacement being at right angles to the optical axis $O_2$—$O_2$.

The contrarotating wedges 18 and 19 are so adjusted as to function as a plane-parallel plate when they assume zero position (as shown in the drawing) and do not accordingly deviate the collimating ray. Rotation of the wedges 18 and 19 relative to each other causes the light beam entering the housing 1 through the aperture 21 to be deviated only in a plane which, in FIG. 1, is parallel to the plane of the drawing. Accordingly, the object image (not shown) is displaced laterally in the plane containing the mark 8. The continuous rotation of the wedges 18, 19 by the electric motor 22 causes the object image to oscillate. This oscillation, viewed stereoscopically in depth direction, is at right angles to the plane of the aperture 21. By rotation of the knob 15, the stereoscopic mark can be set with a high degree of reliability to the center of the oscillation of the stereoscopic image of the object.

In the interest of quick and accurate stereoscopic measurement it is advantageous to provide that the oscillatory motion between stereoscopic mark and object does not take place unless these two have been brought to approximate coincidence. In other words, it is practical to combine coarse measurement with fine measurement.

The device for producing relative motion shown in FIG. 2 is different from that in FIG. 1. In FIG. 2, the wedge 18 has a gear rim 31 which engages a pinion 33 rotatable in bearings 35 and 36 (shown partly in view and partly in section), and the wedge 19 has a gear rim 32 which engages a pinion 34 rotatable in bearings not shown in the drawing. The axes of rotation of the pinions 33 and 34 are parallel to each other. A feeler 37 is rigidly connected with the pinion 33. A spring 38 secured to the feeler 37 on the one hand and to the housing 1 on the other, urges the feeler 37 against a cam disc 39 keyed to an axle 40 of a band pulley 41. A pulley 43 on a shaft 44 of an electric motor 45 rotates the pulley 41 by means of a band 42.

The electric motor 45 rotates the cam disc 39 uniformly through the pulleys 43, 41 and the band 42. The cam disc 39 is so shaped as not or almost not to tilt the sensing element 37 when this element is in contact with the circular peripheral parts of the cam disc 39 (as shown in FIG. 2). Only contact with the plane or approximately plane of the rotating disc 39 will cause the feeler 37 to carry out a tilting motion for transmission via the pinion 33 and the gear rim 31 to the wedge 18 on the one hand and via the pinion 33, the oppositely rotating pinion 34 and the gear rim 32 to the wedge 19 on the other hand.

The transmission can also be effected by gear wheels replacing the band and pulley shown in FIGS. 1 and 2.

In FIG. 3, the mount 46 of a plate 47 is suspended from an axle 48 secured to the housing of the apparatus. The plate 47 may be a wedge for ray deviation or the carrier of a mark. The mount 46 has two pads 49 and 50 for its oscillation against two stationary stops 51 and 52. The lower part of the mount 46 has a notch 53 into which a pin 55 sliding in a guide 54 is urged by a compression spring 56, so that the zero position of the mount 46 is accurately established. An electromagnet 57 near the stop 51 is located on one side of the pin 55 and has a coil 59 which lies in a circuit 61 containing a switch 63 and an electromagnet 58 near the stop 52 is located on the other side of the pin 55 and has a coil 60 which lies in a circuit 62 containing a switch 64. A two-armed lever 65 fulcrumed to an axle 67 at right angles to the plane of the drawing lies on the one side of the pin 55, and a two-armed lever 66 fulcrumed to an axle 68 at right angles to the plane of the drawing lies on the other side of the pin 55. The one end of the levers 65 and 66 are conjugate to each other and are guided between studs 69 and 70 which extend on both the front side and the rear side of the pin 55, the lever 65 sliding on the front side and the lever 66 on the rear side. The other ends of the levers 65 and 66 are respectively fast with plates 71 and 72.

Closing the circuit 61 by means of the switch 63 connects the coil 59, so that the electromagnet 57 produces a magnetic field and attracts the plate 71. The lever 65 accordingly rotates about the axle 67, the stud 70 compresses the spring 56, the pin 55 is dislocated from the notch 53, and the pad 49 fast with the mount 46 is attracted by the electromagnet 57 and urged against the stop 51. The mount 46 remains in that position for the time of about one-quarter of the period of an oscillation, thus causing the plate 47 to vary the parallactic angle about $2\Delta w$ from the angle corresponding the zero position. Thereupon, the switch 63 in circuit 61 is opened and the switch 64, closed. The electromagnet 57 being thus rendered inactive, the mount 46 oscillates back to zero position. The electromagnet 57 drops the plate 71 and, at the same time, the electromagnet 58 attracts the mount 46, so that the pad 50 comes to lie against the stop 52, and the plate 72 is attracted. Accordingly, the lever 65 is inoperative, while the lever 66 by its end in the rear of the pin 55 urges this pin downward by means of the stud 70. The mount 46 remains in that position for, again, the time of about one-quarter of the period of an oscillation, thus causing the plate 47 to vary the parallactic angle about $2\Delta w$ from the angle corresponding to zero position. Thereupon, the switch 64 in circuit 62 is opened and the switch 63, closed. The electromagnet 57 being thus rendered inactive, the mount 46 oscillates back to zero position, the oscillatory movement of the mount 46 being thus repeated in the manner described.

As mentioned hereinbefore, the plate 47 may also be a single glass wedge. In this case the oscillation of the mount 46 about the axle 48 causes the sighting line to deviate not only sideward but also in height. However, by suitably dimensioning the wedge and the oscillatory motion, the altitudinal deviation of the sighting line can be kept small enough for its influence on the measurement to be negligible. The alternating opening and closing of the switches 63 and 64 can be automatic.

FIG. 4 of the drawing illustrates the plate 47 as the carrier of two marks that lie at a definite distance from one another. The plate 47 is located in the object-side focal plane of the eyepiece in a manner similar to that of the carrier 6 in FIG. 1. Accordingly, an identical carrier is to be placed in the object-side eyepiece plane of the eyepiece 30, the parallactic distance between the two marks being taken into consideration. In stereoscopic observation, two measuring marks appear displaced relatively to each other in space by an integral multiple of the width resolving power $\Delta w$.

I claim:

1. A stereoscopic viewing system for stereoscopic measurement of the ranges of objects, comprising
    a pair of objectives,
    a pair of eyepieces,
        each one of said objectives and each one of said eyepieces having a common optical axis and a common image plane, each one of said objectives forming an image of the object in its conjugated image plane,
at least one pair of marks,
a carrier for each of said marks,
one of said marks lying on one of said optical axes, the other of said marks lying on the other of said optical axes,
said pair of eyepieces being for stereoscopic observation of said marks and said object images in said image planes,
means for measurably adjusting the carrier of one of said marks at right angles to the conjugated optical axis,
and means for periodical relative motion of the object and one of said marks at right angles to the conjugated optical axis,
said motion having a frequency $f$ of $$10 \text{ min.}^{-1} \leq f \leq 50 \text{ min.}^{-1}$$

and an amplitude of A of $$1 \frac{\Delta w}{\Gamma} \leq A \leq 10 \frac{\Delta w}{\Gamma}$$

$\Delta w$ being the mean width-resolving power of the human eye and $\Gamma$ being the angular magnification of the viewing system.

2. A system as claimed in claim 1, comprising two magnets and two stops,
the carrier of one of said marks being mounted for oscillation about an axis, said stops defining the extreme positions of the oscillation,
and said magnets being alternately operative for displacing said carrier from one extreme position to the other.

3. A system as claimed in claim 1, wherein
a motor-operated oscillatory optical element effecting a definite ray deflection is located between one of said marks and the object.

References Cited

UNITED STATES PATENTS

| | | | |
|---|---|---|---|
| 1,327,204 | 1/1920 | Henderson | 356—252 |
| 1,798,396 | 3/1931 | Bauersfeld et al. | 350—138 |
| 1,918,540 | 7/1933 | Hartinger | 351—13 |
| 2,258,903 | 10/1941 | Mitchell | 350—144 |

DAVID SCHONBERG, Primary Examiner

P. A. SACHER, Assistant Examiner

U.S. Cl. X.R.

350—133